United States Patent
Zhao et al.

(12) 
(10) Patent No.: US 6,423,764 B1
(45) Date of Patent: Jul. 23, 2002

(54) METHOD OF PRODUCING COLORED POLYESTER THERMOPLASTIC MATERIALS THROUGH SPECIFIC SOLID-STATE PROCEDURES

(75) Inventors: Edward X. Zhao; Todd D. Danielson, both of Moore; Daniel M. Connor, Inman; Jason D. Sprinkle, Woodruff, all of SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/645,717

(22) Filed: Aug. 24, 2000

(51) Int. Cl.[7] .............................. C08J 3/22; C08K 5/06; C08L 67/00
(52) U.S. Cl. ..................... 523/351; 524/190; 524/367; 524/368; 524/601; 528/502
(58) Field of Search .................... 523/351; 524/190, 524/367, 368, 601; 528/502

(56) References Cited

U.S. PATENT DOCUMENTS

| | | | |
|---|---|---|---|
| 3,862,084 A | | 1/1975 | Zandstra et al. ........... 260/40 P |
| 3,932,345 A | * | 1/1976 | Champlin |
| 4,284,729 A | * | 8/1981 | Cross et al. |
| 4,640,690 A | | 2/1987 | Baumgartner et al. ......... 8/506 |
| 4,812,141 A | * | 3/1989 | Baumgartner et al. |
| 5,240,980 A | * | 8/1993 | Danielson et al. |
| 5,464,894 A | | 11/1995 | Gareiss et al. .............. 524/424 |
| 5,938,828 A | * | 8/1999 | Zhao et al. |
| 5,965,653 A | * | 10/1999 | Nishikawa et al. |
| 6,235,374 B1 | * | 5/2001 | Miki et al. |

FOREIGN PATENT DOCUMENTS

| | | |
|---|---|---|
| EP | 0174265 | 3/1986 |
| GB | 1229258 | 4/1971 |
| WO | WO 92/02584 | 2/1992 |
| WO | WO96/30428 | 10/1996 |

OTHER PUBLICATIONS

ASTM Test D 4603–96 "Standard Test Method for Determining Inherent Viscosity of Poly(Ethylene Terephthalate) (PET) by Glass Capillary Viscometer" (1996).

* cited by examiner

*Primary Examiner*—Tae H. Yoon
(74) *Attorney, Agent, or Firm*—Terry T. Moyer; William S. Parks

(57) ABSTRACT

Colored polyester plastics produced through the introduction of coloring agents prior to extrusion but after pellet production of the base polymer are provided. As a result, the plastic is melt-extruded and mixed with the coloring agent and subsequently subjected to solid stating wherein the base polymer is accorded an increase in molecular weight and the coloring agent becomes integrated therein. Such a method permits avoidance of introduction of a coloring agent to the polymerization reaction chamber that results in extensive staining (particularly upon a change of desired colors for the next batch of plastic). Such a method also permits avoidance of the introduction of a coloring agent to an injection molding process that results in uneven color dispersion and sub-optimal physical properties within the ultimate article. The inventive procedure produces colored thermoplastics of substantially the same shades and uniformity as with the aforementioned precoloring or masterbatch process.

6 Claims, No Drawings

METHOD OF PRODUCING COLORED POLYESTER THERMOPLASTIC MATERIALS THROUGH SPECIFIC SOLID-STATE PROCEDURES

FIELD OF THE INVENTION

This invention relates to colored polyester plastics produced through the introduction of coloring agents after initial polymerization has finished but before completion of a solid stating step. As a result, the plastic is melt-extruded and mixed with the coloring agent and subsequently subjected to solid stating wherein the base polymer is accorded an increase in molecular weight and the coloring agent becomes integrated therein. Such a method permits avoidance of introduction of a coloring agent to the polymerization reaction chamber that results in extensive staining (particularly upon a change of desired colors for the next batch of plastic). Such a method also permits avoidance of the introduction of a coloring agent to an injection molding process that results in uneven color dispersion and sub-optimal physical properties within the ultimate article. The inventive procedure produces colored thermoplastics of substantially the same shades and uniformity as with the aforementioned precoloring or masterbatch process.

BACKGROUND OF THE PRIOR ART

Polyesters, most notably polyethylene terephthalates (PET), have been utilized for a variety of purposes, including the production of fibers, films, plastic articles, and engineering resins. In particular, PET is present in different types of resin, such as melt-phase resin (a.k.a., reactor-grade polyester), which is used to produce polyester fibers, and solid-state resin, which is used as the primary source of plastic soda bottles and other polyester articles. The differentiation between such types of resins exists in the molecular weight, reported as intrinsic viscosity (IV), of the particular resins. The greater the IV of the polymer, the greater the tensile properties of the polymer itself. In order to increase molecular weight (as measured by IV) of bottle-grade resins, solid state polymerization must be undertaken in addition to the standard polymerization steps followed to produce the polyester itself. Solid stating generally consists of exposing the already-polymerized polyester resin to relatively high temperatures to form longer chain polymers. The resultant IV of the bottle-grade resin must lie in the range of between about 0.72 and about 0.85 (wherein fiber-grade resin possesses an IV of at most about 0.6).

Colored Polyester resins and thermoplastics have been utilized in a myriad of applications requiring a high IV, including, without limitation, containers, bottles, casings, and the like. Such colorations provide aesthetics and permit identification of certain products and articles. Numerous types of coloring agents have been utilized for such purposes, including, again, without limitation, pigments, dyestuffs, polymeric colorants, and the like. Such varied and different coloring agents are generally introduced within such polyesters in similar ways.

Traditionally, and most prominently, coloring agents have been added during a precoloring or masterbatch process in order to produce colored polyester pellets. Such pellets generally include other additives, such as antistatic agents, plasticizers, and the like, and, since they include the aforementioned coloring agents, are then introduced to the standard extrusion screw (or other type of) melting mechanism. From there, the molten plastic can then be extruded, injected, etc., and molded into the target article. Because of the thorough mixing during the melting phase, such ultimate articles will most likely exhibit substantially uniform colorations throughout and optimum IV properties within the final article.

However, problems do exist with such a traditional method of coloring polyester thermoplastic and resinous articles. Most notably, the polymerization reaction vessel (which, on an industrial scale, is generally measured by volume in the thousands of gallons), in which the entire plastic, coloring agent, and other additives, are initially mixed together, is subject to staining by the utilized coloring agents. The resultant stains must be cleaned, particularly when the next plastic to be polymerized must be of a different color. Such required cleaning potentially adds appreciable costs to colored polyester production and certainly can cost valuable time during such production.

Alternative coloring methods have been followed to alleviate such problems, however they have proven to be less desirable due to difficulties in producing uniform colorations within the target plastic articles. For instance, within injection molding processes, the coloring agents can be introduced during the actual injection molding step. While this process is acceptable for low color loading applications, it, unfortunately, also presents a number of problems especially with high color loading applications. Most notably, the coloring agent potentially functions to deleteriously reduce the IV of the polymer melt. Such modifications of the IV of the polymer results in difficulty in molding and produces final articles with sub-optimized physical properties such as lower or uneven burst strength, poor color dispersion, and more pronounced stress cracking throughout. Furthermore, the introduction of coloring agent at the injection molder, especially at high color loadings, has resulted in processing difficulties, including extended cycle times, screw slippages, and inconsistent injection pressures.

As such, other alternatives are necessary, both to avoid such difficult injection molding coloring procedures (which result in uniformity and IV problems) and the highly staining, and thus costly traditional precoloring or masterbatch processes. Any alternative methods must not deleteriously affect the IV of the resin itself. To date, no such viable alternatives have been developed or followed for polyester article production, particularly those which provide a solid-stated resin with an acceptable IV range for utilization within the desired rigid applications.

OBJECTS AND BRIEF DESCRIPTION OF THE INVENTION

Therefore, an object of the invention is to provide a colored polyester plastic or resin article exhibiting substantially uniform colorations and optimum physical properties throughout and produced through a method which does not include any staining by the utilized coloring agent within a melt polymerization reaction vessel. Another object of the invention is to provide a colored thermoplastic resin wherein the coloring agent is introduced after the polymerization step and before the completion of the solid stating procedure, wherein the intrinsic viscosity of the colored polymer after solid-stating is similar to that of the correlative, uncolored polymer, preferably at a level between about 0.60 and 0.86, more preferably between about 0.70 and 0.86. Another object of the invention is to provide a relatively inexpensive but greatly improved method for coloring polyester thermoplastic materials.

Accordingly, this invention encompasses a method for producing colored polyester thermoplastic or resinous articles comprising the sequential steps of a) providing a molten uncolored resin;
b) introducing said resin of step "a" into a pre-pellet formation device, optionally with at least one coloring agent;
c) forming pellets of said resin of step "b", and optionally coating said pellets with at least one coloring agent;
d) introducing the pellets of step "c" into a solid stating vessel, optionally with at least one coloring agent; and
e) molding the colored solid stated polyester of step "d" into a polyester article; wherein a coloring agent is added in at least one of steps "b", "c", or "d".

The term pre-pellet formation device is intended to encompass any device in which the polyester is introduced after polymerization is complete, but prior to production of polyester pellets. Thus, such a device may include, without limitation, mixers, such as gear pumps, static mixers; extruders for the polymer prior to cooling and ultimate cutting into pellets, such as extrusion screws, and the like; polymer sheet producers and cutters, such as calendaring equipment, die face pelletizers, and the like; and pre- or post-mixing devices in combination with such other devices. Basically, this term thus encompasses any standard component within a polyester molding line which is oriented after the initial polymerization device and before the device which produces the polyester pellets for further processing.

The term "solid stating vessel" is intended to encompass any standard solid stating device for polyester production which permits an increase in molecular weight (and thus IV) through an increase in exposure temperature to a level just below the melting point of the specific type of resin involved. Such a procedure is discussed in greater detail below.

DETAILED DESCRIPTION OF THE INVENTION

As noted above, solid stating is performed in order to increase the molecular weight of the target polymer, particularly to provide rigidified polyesters for specific applications. Such high flexural modulus plastics are produced through the initial production of polyester pellets through conventional melt polymerization (a.k.a., precolor-masterbatch, -pellet, -feedstock, -flake, etc., production) in order to produce a polymer with an intrinsic viscosity of from about 0.5 to about 0.6. This low molecular weight polymer is then subjected to a solid stating procedure, which involves exposure to temperatures of sufficient levels to effectuate an increase in molecular weight of the polymer but not to melt the polymer. Such temperatures differ from one type of polymer to another depending upon the degree of polymerization increase desired and the actual melting point of the particular polymer involved. Such a solid stating step also facilitates removal of unwanted processing byproducts or no-longer-needed additives (such as ethylene glycol, acetaldehyde, and the like).

A typical solid-stating unit includes a chip feed hopper which feeds into a screw conveyor for metering of amorphous pellets, chips, flakes, etc., into an agitating crystallizer vessel. Upon heating within the screw and crystallizer, the amorphous polymers, being partially crystallized, are fed to another crystallizer and purge screw, both in which the temperature is raised further above the initial screw and crystallizer temperature(s), but still below the polymer melt temperature. The resultant crystalline polymers are then introduced into a heated reactor column to permit the continuation of the polymerization reaction and thus to effectuate an increase in polymerization and, ultimately, molecular and intrinsic viscosity. The reaction products are then cooled and dried and passed onto storage units.

Standard, traditional, colored polyesters production methods followed such a solid stating procedure to produce high molecular weight polymers. In such an instance, the coloring agents were thoroughly mixed and integrated within the high molecular weight final polymer product. However, as noted above, the main problem with the traditional coloring method is that it required addition of the coloring agent during the feedstock (a.k.a., precolor, masterbatch, etc.) production step, otherwise known as the initial polymerization process. The intrinsic viscosity of the polymer at the conclusion of such a step is, again, between about 0.5 and 0.6, far below the intrinsic viscosity required of bottle-grade, high impact, polyesters produced through subsequent solid stating procedures. The early coloring agent introduction thus resulted in, as discussed above, staining of the initial reaction vessel during the initial polymerization procedure. If a producer required a change in shades, colors, or the like, substantial cleaning steps and costs were necessary to ready the initial reaction vessel for further use.

This invention thus encompasses the unexpected value and benefit of introducing coloring agents after initial polymerization is complete, but before the final injection molding step. Such an addition has not been followed in the past due to the difficulties in controlling the intrinsic viscosity of the solid stated product with the addition of compounds and/or liquids of low, or more importantly, different IVs or molecular weights than for the initially produced polymer itself. Since the target intrinsic viscosity for the solid stated polymer is quite high, and the solid state procedures typically followed to obtain such specific high molecular weights (and thus IV properties) were directed primarily at polymer formulations of initially polymerized resins, etc., alone, additions of lower molecular weight coloring agents were avoided. It has now been surprisingly found that final target IV can be met even through the addition of low molecular weight coloring agents after polymerization is complete, and prior to commencement of solid stating. Furthermore, since the coloring agent become integrally part of the final high molecular weight polymer, very little, if any staining, of the crystallizing chambers or reaction column occurs with such a inventive method.

The coloring agents of this invention may, as noted above, be selected from any standard type for PET colorations, including, without limitation, pigments, dyestuffs, polymeric colorants, and dye/quaternary ammonium complexes. Such coloring agents include compounds which do not provide visible colorations, such as ultraviolet absorbers and infrared absorbers, which would be added to protect the target polyester from degradation due to exposure to such wavelengths of light. Thus, certain dyes, dyestuffs, and polymeric colorants may be added to the target polyester which exhibit such protective properties and which therefore are encompassed by the definition of "coloring agent". Most preferred of this list of coloring agents are polymeric colorants and particularly those which are polyoxyalkylenated.

Poly(oxyalkylene) polymeric colorants have been utilized to permanently color myriad substrates, including thermoplastic resins, such as U.S. Pat. No. 4,284,729 to Cross et al., U.S. Pat. No. 4,507,407 to Kluger et al., and U.S. Pat. No. 4,751,254 to Kluger et al.; polyurethane foams, such as U.S. Pat. No. 4,846,846 to Rekers et al.; aqueous and non-aqueous liquids, such as U.S. Pat. No. 4,871,371 to Harris; and have been used as fugitive tints for textiles and threads, such as U.S. Pat. No. 4,167,510 to Brendle. Such colorants provide effective and stable colorations to such materials, are easily handled, and exhibit desirable migratory properties within certain substrates.

Colorants have been developed for utilization within polymer resins, including in polyester (polyethylene terephthalate, for instance), such as U.S. Pat. No. 4,332,587, to Kresser et al., U.S. Pat. No. 4,640,690, to Baumgartner et al., U.S. Pat. No. 4,732,570, to Baumgartner et al., 4,812,141, to Baumgartner et al., U.S. Pat. No. 5,157,067, to Burditt et al., U.S. Pat. No. 5,240,980, to Danielson et al., 5,326,516, to Branon, U.S. Pat. No. 5,443,775, to Brannon, and U.S. Pat. No. 5,686,515, to Phillips et al. Such broadly listed compounds generally conform to Formula (I)

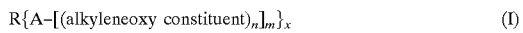

R{A-[(alkyleneoxy constituent)$_n$]$_m$}$_x$  (I)

wherein

R is an organic chromophore;

A is a linking moiety in said chromophore selected from the group consisting essentially of N, O, S, or $CO_2$;

Alkyleneoxy constituent contains from 2 to 4 carbon atoms;

n is an integer of from 2 to about 100;

m is 1 when A is O, S, or $CO_2$, and m is 2 when A is N;

x is an integer of from 1 to about 5.

The poly(oxyalkylene) colorants are generally the same as those disclosed within the prior patents listed above. The organic chromophore (R) may be any type of construct which exhibits color in the visible, ultraviolet, or infrared spectrum. More specifically, the organic chromophore is one or more of the following types of compounds: azo, diazo, disazo, trisazo, diphenylmethane, triphenylmethane, xanthane, nitro, nitroso, acridine, methine, indamine, thiazole, oxazine, phthalocyanine, or anthraquinone. Preferably, R is one or more of nitro, triphenylmethane, methine, or thiazole based compounds. Group A is present on group R and is utilized to attach the polyoxyalkylene constituent to the organic chromophore. Nitrogen is the preferred linking moiety. The polyoxyalkylene group is generally a combination of ethylene oxide (EO) and propylene oxide (PO) monomers.

The preferred number of moles of polyoxyalkylene constituent per alcohol chain is from 2 to 15 (n would therefore preferably be from 4 to 30), more preferably from 4 to 10 (n would most preferably be from 8 to 20). Also, preferably two such alcohol chains are present on each polymeric colorant compound (x, above, is preferably 2). The colorants utilized within the present invention are generally liquid at ambient conditions of temperature and pressure. Examples of the particularly preferred colorants are presented in tabulated form below with the understanding that the Moles of EO and PO are ranges due to the difficulty in exactly controlling such alkoxylation.

TABLE 1

Preferred Poly(oxyalkylenated) Colorants

| Ex. # | Chromophore | Moles EO | Moles PO | Group A |
|---|---|---|---|---|
| 1 | Methine | 14–18 | 8–10 | N |
| 2 | Phthalocyanine | 12–15 | 2–4 | N |
| 3 | Triphenylmethane | 8–10 | 12–15 | N |
| 4 | Anthraquinone | 12–15 | 8–10 | N |
| 5 | Bisazo | 15–18 | 18–20 | N |

This list is, of course, merely intended to note the preferred colorants; any poly(oxyalkylenated) polymeric dye is encompassed within the scope of the invention.

Other colorants may also be present within this composition, most notably a substantially inorganic salt free complex comprised of an anionic dye and a quaternary ammonium compound, such as taught and disclosed within U.S. Pat. No. 5,938,828 to Zhao et al., and U.S. Pat. No. 5,948,152 to Zhao et al. Such quaternary ammonium compounds include trialkyl quats, such as methyl tri (hydrogenated tallow) ammonium chloride; dialkyl quats, such as dicoco dimethyl ammonium chloride; dialkoxy alkyl quats, such as methyl bis(polyethoxyethanol) coco ammonium chloride; monoalkoxy quats, such as methyl (polypropylene glycol) diethyl ammonium chloride; and benzyl quats, such as dimethyl tallow benzyl ammonium chloride. Preferred are methyl bis[polyethoxy (15) ethanol] coco ammonium chloride (trade name Variquat® K1215, from Witco) and methyl (polypropylene glycol) diethyl ammonium chloride (trade name Emcol™ CC-9, from Witco). The table below shows the preferred anionic dyes which may be utilized also.

TABLE 2

Preferred Anionic Dye/Quaternary Ammonium Complex Colorants

| Ex. # | Dyes | Quaternary compounds | Physical Form |
|---|---|---|---|
| 6 | Acid red 52 | Variquat ® K1215 | Liquid |
| 7 | Acid yellow 17 | Variquat ® K1215 | Liquid |
| 8 | Quinoline yellow S | Variquat ® K1215 | Liquid |
| 9 | Quinoline yellow S | Emcol ™ CC-9 | Liquid |
| 10 | Acid yellow 23 | Variquat ® K1215 | Liquid |
| 11 | Direct violet 9 | Variquat ® K1215 | Liquid |
| 12 | Acid red 52 | Emcol ™ CC-9 | Liquid |
| 13 | Direct blue 86 | Variquat ® K1215 | Liquid |

Other such complexes are intended to be within the scope of this invention as this list is not intended to be exhaustive.

These complexes are produced first by determining the desired anionic dye to be utilized for its shade, lightfastness, thermal stability, and the like, for the subject substrate to be colored; second, select the appropriate quaternary ammonium compound for the subject substrate based on the necessarily required physical properties such as migration, uniform dispersion, solubility, washfastness, and the like; third, react the two compounds together to form a liquid complex; and last, remove the unwanted salts formed from the cation of the dye and the counter-ion of the quat. Various purification techniques may be performed in order to remove substantially all of the residual inorganic salts (such as chlorides and sulfates, as merely examples) from the complexes. Such techniques include, but are not limited to, solvent extraction, phase separation, ultrafiltration, and other filtration methods. Particularly preferred are ultrafiltration under high pressure, phase separation through the utilization of an ammonium carbonate rinsing procedure (i.e., three consecutive washings with 25% aqueous ammonium carbonate in a 1:1 weight ratio to complex), and solvent extraction filtration through the utilization of methylene chloride, chloroform, or the like. After the removal of excess inorganic salt, the resultant solution should also be stripped of excess water in order to purify the colorant complex. The inventive complexes will always form a liquid upon purification at a temperature below about 100° C. The particular methods of producing these types of colorants, through complexation and salt removal, are disclosed within U.S. patent application Ser. No. 09/065,597, by Zhao et al., herein incorporated by reference.

Other coloring agents useful in this invention include pigments and dyestuffs. Such compounds include, without limitation, phthalocyanine/metal complexes, solvent dyes, carbon black, vat dyes, acid dyes, and the like. It is to be understood that mixtures of any of such polymeric colorants, dye/quaternary ammonium complexes, pigments, dyestuffs, and the like, may also be introduced within the inventive method to provide colorations to the final high flexural modulus product.

The amount of coloring agents or agents added within the final product should be any where from 10 to about 15,000 ppm of polymer constituent, depending on the depth of shade desired. Preferably, such an amount ranges from about 100 to about 6,000 ppm, most preferably from about 200 to about 5,000.

The term polyester thermoplastic material (or composition or resin) is intended to encompass any polyester, including co-polymers of different polyesters, thermoplastics comprised of a majority of polyester constituents, and a single polymer of polyester (i.e., polyethylene terephthalate, which is the preferred species). The term "feedstock" is intended to encompass virgin or recycled polyester, whether in shredded, chipped, pelletized, or any like form which is produced or polymerized within a continuous polymerization procedure. The term "thermoplastic" is well known in the art to mean a polymeric material that will melt upon exposure to sufficient heat but will retain its solidified state, but not prior shape without use of a mold, upon sufficient cooling. The inventive colored polyester thermoplastic is intended to be utilized ultimately as, for instance and not by limitation, containers for soft drinks, beer, liquor, water, and the like, as well as containers for any solid materials, as well as for article casings, laminates, and the like.

The polyester pellets to which the coloring agent(s) is added, generally comprise the vast majority of the polymer or co-polymers of polyester. Optional additives may include plasticizers, such as PEG-400 and dibutyl phthalate, and the like, antistatic agents, stabilizers, ultraviolet absorbers, and other similar standard polyester thermoplastic additives.

Preferred Embodiments of the Invention

Examples of particularly preferred methods of coloring polyester thermoplastics and the preferred correlated colored articles within the scope of the present invention are exemplified below.

Samples of uncolored PET pellets (Shell 8406 from, exhibiting an initial IV of 0.84, nominal) were tested as controls for a base solution intrinsic viscosity (SIV) of the polymer. The pellets were dried under standard conditions (350° F. for 6 hours) to less than 20 ppm moisture and were then extruded on Killion 32:1 (length:diameter ratio) single screw 1 inch diameter extruder.

The same type of base pellets as in the control were then compounded with the coloring agents, as listed below in relation to the TABLEs above, or listed below in full for the particular pigment composition utilized, after pelletizing was complete but prior to initiation of the solid state procedure. The colorants were added in amounts of 250 or 5000 ppm (with less than 20 ppm moisture) within the ultimately dried and solid stated PET on the Killion 32:1 extruder. After solid stating, the final products (including the control resin) were injection molded into test plaques and tested for both IV and extraction. The test plaques included both merely dried and compounded polymers, and further solid stated polymers.

To simulate the solid state process, each of the colored samples and the clear, extruded control were heated under vacuum (with a small amount of nitrogen flowing through the vacuum oven), at 440° F. for 6 hours.

Intrinsic viscosity was measured in accordance with ASTM Test Method D 4603-96, "Standard Test Method for Determining Inherent Viscosity of Poly(Ethylene Terephthalate (PET) by Glass Capillary Viscometer".

The visual appearance of the colored plaques before and after the solid state process was compared empirically. In all cases, no deterioration of the color was noted.

The injection molded test plaques were further tested for extraction by the following protocol. A plaque of a surface area of 25.0 inch$^2$ was placed in 250 grams of an extraction solution of 10% ethanol in water. The test plaques in extraction solution were held at 70° C. for 2.5 hours. The resulting extract was analyzed on a UV/V is spectrophotometer for any absorption of the color to a detection limit of 10 ppb in comparison with the same type of measurement prior to placement in the extraction solution. Extraction results are reported as the change in absorbance at the wavelength of maximum absorption or as non-detectable.

All of these tests were performed on the solid stated plastics produced by the inventive method and non-solid stated plastics in order to compare the effect of such a step on the addition of such colorants as well as to determine if the proper IV is available from practice of the inventive method.

The particular coloring agents tested were as follows, at both the aforementioned 250 and 5000 ppm addition amounts:

TABLE 1, Example 1; TABLE 1, Example 4; TABLE 2, Example 13; and a pigment dispersion, consisting of: 13.7% Copper phthalocyanine; Pigment blue 15:3 (Ciba-Geigy; Irgalite® Blue LGLD); 14.9% Solvent yellow 33 (Warner-Jenkinson Co.); and 71.4% Nonyl phenol ethoxylate (Prillman Chemical Co.; Surfonic® N95).

The results of the above-noted tests are tabulated as follows with the label of "Treated or Not Treated" relating to the performance of solid stating or not and the Control Compositions did not include any coloring agents:

EXPERIMENTAL DATA TABLE 1
Solution Intrinsic Viscosity Measurements

| Comp. # | Sample (w ppm of Col. #) | Treated or Not Treated | Solution IV |
|---|---|---|---|
| A | 250 ppm of Table 1, Example 1 | Treated | 0.766 |
| B | 5000 ppm of Table 1, Example 1 | Treated | 0.750 |
| C | 250 ppm of Table 1, Example 4 | Treated | 0.731 |
| D | 5000 ppm of Table 1, Example 4 | Treated | 0.641 |
| E | 250 ppn of Table 2, Example 13 | Treated | 0.783 |
| F | 5000 ppm of Table 2, Example 13 | Treated | 0.664 |
| G | 250 ppm of Pigment Dispersion | Treated | 0.780 |
| H | 5000 ppm of Pigment Dispersion | Treated | 0.657 |
| (Comparatives) | | | |
| I | 250 ppm of Table 1, Example 1 | Not Treated | 0.621 |
| J | 5000 ppm of Table 1, Example 1 | Not Treated | 0.635 |
| K | 250 ppm of Table 1, Example 4 | Not Treated | 0.686 |
| L | 5000 ppm of Table 1, Example 4 | Not Treated | 0.576 |
| M | 250 ppn of Table 2, Example 13 | Not Treated | 0.681 |
| N | 5000 ppm of Table 2, Example 13 | Not Treated | 0.595 |
| O | 250 ppm of Pigment Dispersion | Not Treated | 0.669 |
| P | 5000 ppm of Pigment Dispersion | Not Treated | 0.599 |
| Q | Control | Treated | 0.710 |
| R | Control | Not Treated | 0.701 |

In each instance, the IV for the samples subjected to the inventive process exceeded those of the corresponding uncolored resins, therefore indicating the suitability of adding such coloring agents after polymerization and prior to injection molding. Hence, the increased IVs accorded the plastic compositions during the inventive process permitted utilization of such compositions within high strength plastic applications.

A plaque utilizing Composition B, above, was then produced and tested for extraction by the method as described above. The inventive plaque did not exhibit any detectable extraction of color.

Thus, plaques produced by the inventive method exhibit excellent extraction results very comparable to those not subjected to the solid stating step. With such excellent results, the inventive plaques are thus very good candidates for utilization, again, within high strength polyester applications.

Thus, the characteristics exhibited provided by the inventive solid stated colored polyesters were essentially the same as for the uncolored and colored, but untreated (not solid stated) polyesters; met the required high IV for solid stated, high strength polyester; and exhibited excellent color loss and extraction properties. Therefore, the inventive method is a viable procedure for avoiding the high cost staining problems of the traditional coloring processes for colored polyester production.

Having described the invention in detail it is obvious that one skilled in the art will be able to make variations and modifications thereto without departing from the scope of the present invention. Accordingly, the scope. of the present invention should be determined only by the claims appended hereto.

That which is claimed is:

1. A method for producing colored polyester thermoplastic or resinous articles comprising the sequential steps of
   a) providing a molten uncolored resin;
   b) introducing said resin of step "a" into a pre-pellet formation device, optionally with at least one coloring agent;
   c) forming pellets of said resin of step "b", and optionally coating said pellets with at least one coloring agent;
   d) introducing the pellets of step "c" into a solid stating vessel, optionally with at least one coloring agent; and
   e) molding the colored solid stated polyester of step "d" into a polyester article;
wherein a coloring agent is added in at least one of steps "b", "c", or "d".

2. The method of claim 1 wherein said coloring agent includes at least one coloring agent selected from the group consisting of at least one pigment, at least one dyestuff, at least one polymeric colorant, at least one dye/quaternary ammonium complex, and any mixtures thereof.

3. The method of claim 2 wherein said coloring agent is at least one polymeric colorant.

4. The method of claim 3 wherein said at least one polymeric colorant is selected from the group of polyoxyalkylenated colorants defined by the Formula (I)

wherein
   R is an organic chromophore;
   A is a linking moiety in said chromophore selected from the group consisting of N, O, S, and $CO_2$;
   Alkyleneoxy constituent contains from 2 to 4 carbon atoms;
   n is an integer of from 2 to about 100;
   m is 1 when A is O, S, or $CO_2$, and m is 2 when A is N;
   x is an integer of from 1 to about 5.

5. The method of claim 2 wherein said coloring agent includes at least one pigment.

6. The method of claim 2 wherein said coloring agent includes at least one dye/quaternary ammonium complex.

* * * * *